US009097825B1

(12) United States Patent
Gupta et al.

(10) Patent No.: US 9,097,825 B1
(45) Date of Patent: Aug. 4, 2015

(54) WHITE TAPE IN A FRONT LIGHT DISPLAY COMPONENT STACK

(71) Applicant: Amazon Technologies, Inc., Reno, NV (US)

(72) Inventors: Siddharth Gupta, San Bruno, CA (US); Gregory Turner Witmer, Portola Valley, CA (US)

(73) Assignee: Amazon Technologies, Inc., Reno, NV (US)

( * ) Notice: Subject to any disclaimer, the term of this patent is extended or adjusted under 35 U.S.C. 154(b) by 115 days.

(21) Appl. No.: 13/925,123

(22) Filed: Jun. 24, 2013

(51) Int. Cl.
*F21V 8/00* (2006.01)

(52) U.S. Cl.
CPC ............ *G02B 6/0031* (2013.01); *G02B 6/0065* (2013.01)

(58) Field of Classification Search
USPC .................................................. 362/600–634
See application file for complete search history.

(56) References Cited

U.S. PATENT DOCUMENTS

| | | | |
|---|---|---|---|
| 2008/0239754 A1* | 10/2008 | Kang et al. | 362/617 |
| 2010/0110334 A1* | 5/2010 | Oki et al. | 349/62 |
| 2012/0187426 A1* | 7/2012 | Ono | 257/88 |
| 2012/0236231 A1* | 9/2012 | Choi et al. | 349/65 |
| 2012/0281165 A1* | 11/2012 | Choi et al. | 349/62 |
| 2013/0148058 A1* | 6/2013 | Zhu | 349/65 |

* cited by examiner

*Primary Examiner* — Laura Tso
(74) *Attorney, Agent, or Firm* — Seyfarth Shaw LLP; Brian L. Michaelis (57) ABSTRACT

A front light component for electronic devices that include displays for rendering content using a light guide to control illumination for a front light display. A high reflectivity "white" tape is used under and adjacent to the light guide to improve overall uniformity of the light beams. The high reflectivity tape may also be selected to be of a controlled white hue to compensate for variances in color of Light Emitting Diodes (LEDs) where the LED color is slightly off from ideal white. In this way the complementary color of the high reflectivity tape with the color of the LED will cause the output spectrum to be uniform and white. This disclosure also describes techniques for assembling electronic devices in a component stack to provide enhanced display uniformity and improved reading experience.

21 Claims, 6 Drawing Sheets

WHITE TAPE IN A FRONT LIGHT DISPLAY COMPONENT STACK

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 2A:
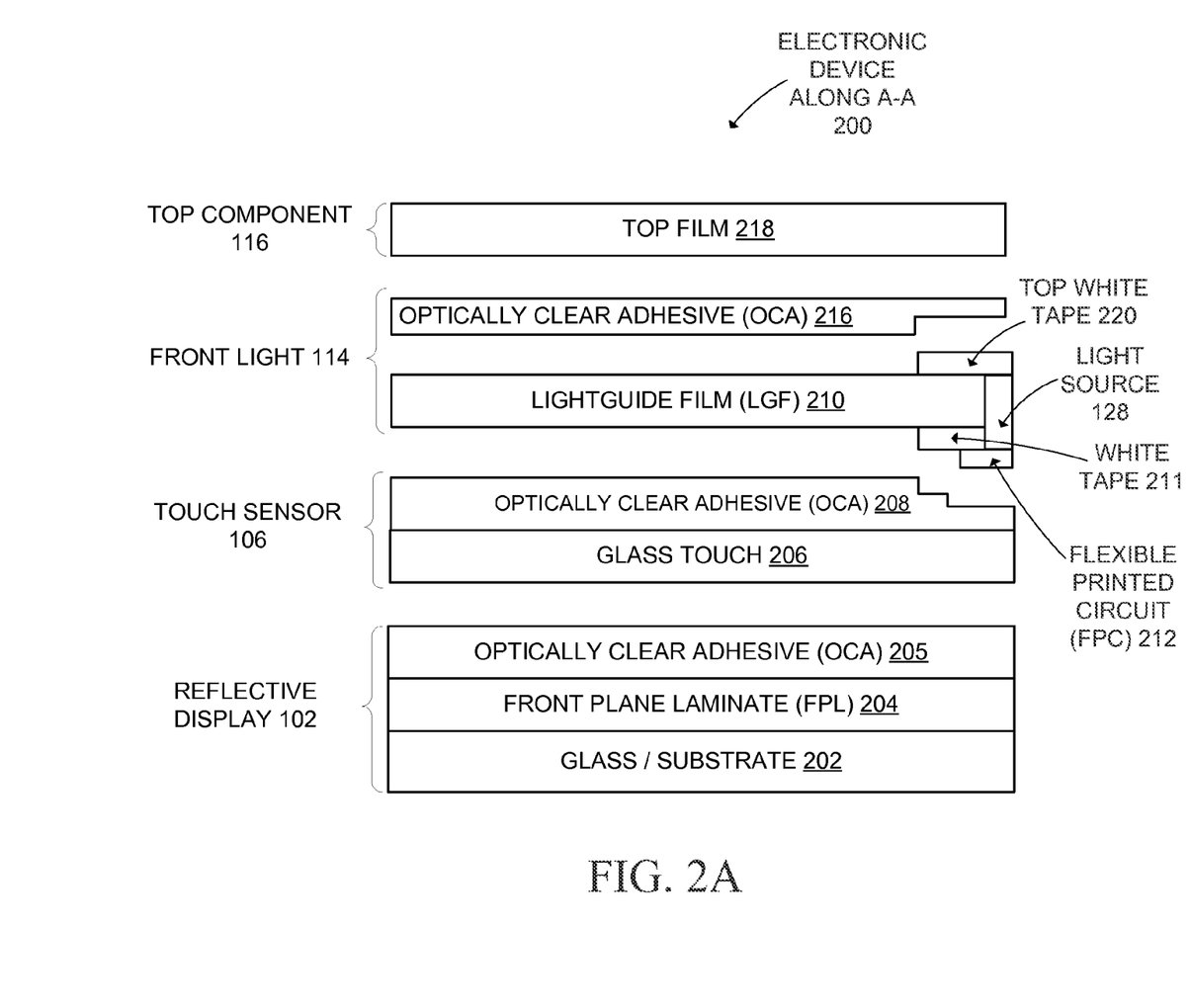
FIGS. 2A-2B each illustrate an example schematic cross-section of the electronic device of FIG. 1.
Figure 2B:
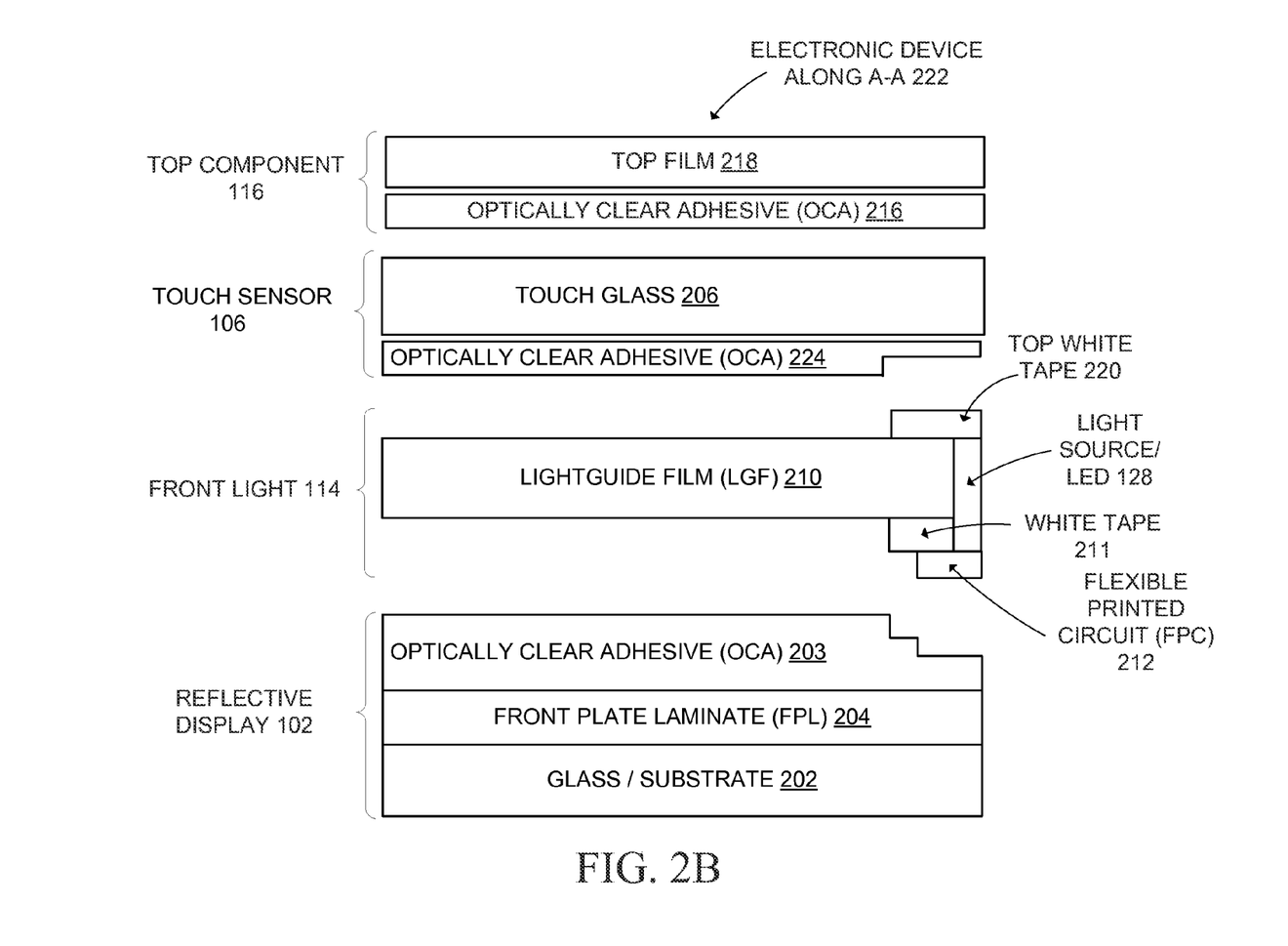

This disclosure describes electronic devices that include displays for rendering content using a light guide to control illumination for a front light display. When using a light guide to control illumination of the front light display, uniformity of the display is a primary consideration. When the light guide comes in contact with, or is otherwise impacted by other materials located proximate to it, a change in refractive index may occur that alters the behavior of otherwise uniform light beams, creating distortion of the illumination, including shadows. To reduce interference from materials proximate to the light guide, a high reflectivity "white" tape can be used under and adjacent to the light guide to improve overall uniformity of the light beams, as illustrated in FIGS. 2A and 2B, and described below. Such a high reflectivity white tape may be, for example, LAB W55 available from Teraoka Seisakusho Co. Ltd of Tokyo, Japan. The desirable high reflectivity white tape has a high degree of reflectivity and a high shading rate, with low glare which allows light produced by a light source to be substantially uniform through the light guide.

In the embodiments illustrated, and described in greater detail below, a light source 128 may be coupled to a flexible printed circuit (FPC) 212. High reflectivity white tape 211 may be coupled between a light guide film 210 to essentially form a front light 114 for the front light display. In some instances, the light source 128 (e.g., one or more Light Emitting Diodes (LEDs) may be coupled to the FPC 212 via an optically clear adhesive (OCA), such as a solid strip of OCA, or liquid optically clear adhesive (LOCA) or the like.

The light source 128 is configured to emit light into the light guide film 210. The uniformity of the light going into the light guide film 210 may impact the quality of light that the user sees coming from the display. The highly reflective white tape 211 under the light guide film 210 diffuses the light such that the light going into the light guide is substantially uniform. Accordingly, the light reflecting off of the display is also substantially uniform. Without the highly reflective white tape 211 imperfections in the light beams may result from the materials proximate to the light guide film 210 (such as the material that forms the flexible printed circuit 212) causing light beams to group together and form dark and/or bright areas, or non-uniform light thus negatively affecting the user's ability to read content on the display of the device 200.

The high reflectivity tape may also be selected to be of a controlled white hue to compensate for variances in color of LEDs where the particular light emitted from the LED is slightly off from ideal white. In this way the complementary color of the high reflectivity tape with the color of the LED will cause the output spectrum to be uniform and white. This disclosure also describes techniques for assembling electronic devices in a component stack to provide enhanced display uniformity and improved reading experience.

Figure 1:
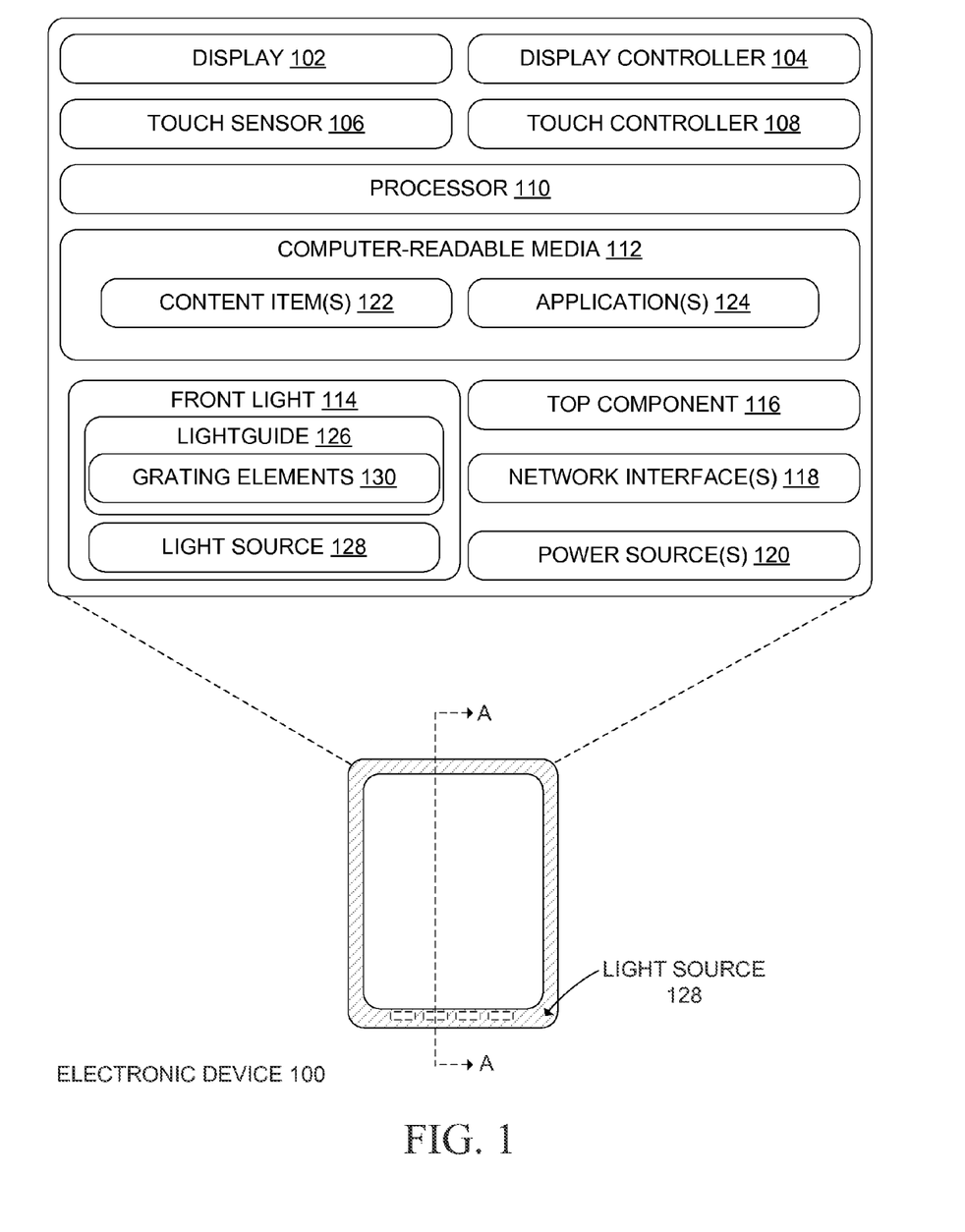
FIG. 1 illustrates an example electronic device that includes a display, a touch sensor atop the display, a front light atop the touch sensor and a component atop the front light.

FIG. 1 illustrates an example electronic device 100 that includes a component stack of a device as introduced above. The device 100 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, which may not include all of the components illustrated in FIG. 1, it includes a display 102 and a corresponding display controller 104. The display 102 may represent a reflective display in some instances, such as an electronic paper display, a reflective LCD display or the like.

Electronic paper displays represent an array of display technologies that mimic the look of ordinary ink on paper. In contrast to conventional backlit displays, electronic paper displays typically reflect light, much as does ordinary paper. In addition, electronic paper displays are often bi-stable, meaning that these displays are capable of holding text or other rendered images even when very little or no power is supplied to the display.

In one implementation, the display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

It should be appreciated that as used herein, the term "white" for example as used in relation to a pixel or light through a light guide may comprise any shade of white or off white. Similarly, a "black" pixel may similarly comprise any shade of black. Further, although "white" or "ideal white" is discussed herein as the desired color for a display according to the disclosure, it should be appreciated that the concepts herein may apply as well to other desired colors and/or display applications.

In another implementation, the display 102 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

In a further implementation, the display 102 comprises an electrowetting display that modifies the surface tension of a colored oil film on a solid surface using a voltage. In the absence of voltage, the colored oil forms a continuous film. Conversely, when voltage is applied, the oil is displaced and the underlying solid surface becomes visible due to the modification of the hydrophobic surface into an increasingly hydrophilic surface. By activating different solid surfaces independently, the display may show content such as a photograph. Furthermore, by applying a high switching speed of electrowetting, such as a few milliseconds, images such as videos may be produced.

Of course, while these different examples have been given, it is to be appreciated that the reflective displays described herein may comprise any of various other types of electronic-paper technology or reflective-display technology, such as gyricon displays, electrofluidic displays, interferometric modulator displays, cholestric liquid crystal displays, and the like. In addition, while some of the examples described above are discussed as rendering black, white, and varying shades of gray, it is to be appreciated that the described techniques apply equally to reflective displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In addition to including the display 102, FIG. 1 illustrates that the device 100 may include a touch sensor 106 and a touch controller 108. In some instances, at least one touch sensor 106 resides atop the display 102 to form a touch-sensitive display (e.g., an electronic paper touch-sensitive display) that is capable of both accepting user input and rendering content corresponding to the input. As described in further detail below, the touch sensor 106 may reside atop a substrate (e.g., atop a glass substrate) of the display 102.

The touch sensor 106 may comprise a capacitive touch sensor, a force sensitive resistance (FSR), an interpolating force sensitive resistance (IFSR) sensor, or any of various other types of touch sensor. In some instances, the touch sensor 106 is capable of detecting touches as well as determining an amount of pressure or force of these touches. In examples described below, the touch sensor 106 comprises a capacitive touch sensor.

FIG. 1 further illustrates that the electronic device may include one or more processors 110 and computer-readable media 112, as well as a front light 114 for lighting the display 102, an antiglare or top component 116 for reducing glare of incident light or providing other desired surface characteristics such as a hard-coat for scratch resistance, textured surface for desired tactile feel, or the like. The device may also include one or more network interfaces 118 and one or more power sources 120. The network interfaces 118 may support both wired and wireless connection to various networks, such as cellular networks, radio, WiFi networks, short range networks (e.g., Bluetooth), IR, and so forth.

Computer-readable media 112, which may include, but is not limited to, RAM, ROM, EEPROM, flash memory, or other memory technology, may be used to store any number of functional components that are executable on the processors 110, including content items 122 and applications 124. Thus, the computer-readable media 112 may include an operating system and a storage database to store one or more content items, such as eBooks, audio books, songs, videos, still images, and the like. The computer-readable media 112 of the electronic device 100 may also store one or more content presentation applications to render content items on the device 100. These content presentation applications may be implemented as various applications depending upon the content items. For instance, the application may be an electronic book reader application for rendering textual electronic books, an audio player for playing audio books or songs, a video player for playing video, and so forth.

The amount of light emitted by the front light 114 may vary. For instance, upon a user opening a cover of the device, the light from the front light may gradually increase to its full illumination. In some instances, the device 100 includes an ambient light sensor and the illumination of the front light 114 may be based at least in part on the amount of ambient light detected by the ambient light sensor. For instance, the front light 114 may be brighter if the ambient light sensor detects relatively little ambient light, and may be dimmer if the ambient light sensor detects a relatively large amount of ambient light.

In addition, the settings of the display 102 may vary depending on whether the front light 114 is on or off, or based on the amount of light provided by the front light 114. For instance, the electronic device 100 may implement a larger default font or a greater contrast when the light is off compared to when the light is on. In some instances, the electronic device 100 maintains, when the light is on, a contrast ratio for the display that is within a certain defined percentage of the contrast ratio when the light is off.

As described above, the touch sensor 106 may comprise a capacitive touch sensor that resides atop the display 102. The front light 114, meanwhile, may reside atop the capacitive touch sensor. In some instances, the front light 114 couples to a top surface of the capacitive touch sensor via optically clear adhesive (OCA), such as a solid OCA (SOCA) or a liquid OCA (LOCA). In the latter instances, the device 100 may be assembled by placing the LOCA atop the touch sensor 106 and, when the LOCA reaches the corner(s) and/or at least a portion of the perimeter of the touch sensor 106, UV-curing the LOCA on the corners and/or the portion of the perimeter. Thereafter, the remaining LOCA may be UV-cured and the front light 114 may couple to the LOCA. By first curing the corner(s) and/or perimeter, the techniques effectively create a barrier for the remaining LOCA and also prevent the formation of air gaps in the LOCA layer, thereby increasing the efficacy of the front light 114. In other implementations, the LOCA may be placed near a center of the top surface of the touch sensor, pressed outwards towards a perimeter of the top surface of the touch sensor and cured.

As illustrated, the front light 114 includes a light guide 126 and a light source 128. The light guide 126 comprises a substrate (e.g., a transparent thermoplastic such as PMMA), a layer of lacquer and multiple grating elements 130 that function to propagate light from the light source 128 towards the reflective display 102, thus illuminating the display 102. To create the grating elements, the layer of lacquer may be applied to the substrate of the light guide 126, the grating elements may be embossed to the layer of lacquer, and the light guide 126 may be UV-cured. Alternatively, the substrate of the light guide and the grating elements may be manufactured as a single element, such as via an injection molding process. In some instances, the UV lacquer is made of a cross-linked, tri-functional polymer material that co-polymerizes to a plastic solid when exposed to a high-intensity UV light source. Also as illustrated in FIG. 1, the light source 128 may comprise one or more (e.g., four) LEDs, which may reside toward a bottom edge of the electronic device. By positioning the LEDs along the bottom portion of the display 102 relative to the content being displayed, light from the light source 128 is generally directed away from a user consuming the content and, hence, is not directed into the user's eyes. That is, because users typically hold the device with the top edge further away from the user's eyes than the bottom edge (i.e., with the top edge tilted away from the user, given the user's line of sight to the top edge), the lights positioned on the bottom of the display will generally shine towards the top edge and away from the user's eyes. As such, positioning the LEDs in this manner may decrease the chances of the light being directed into a user's eyes.

The light from the light source generally travels along the plane of the light guide 126 and the display 102 until it contacts the grating elements 130, at which point the grating elements 130 generally direct the light downwards (and towards) the display 102. In some instances, the multiple LEDs may be positioned such that they collectively emulate a single point source. For instance, each LED may emit light over a particular angle that is in the shape of a triangle. The LEDs may be aligned and spaced (relative to one another and relative to an active area of the display) such that these triangles overlap in a manner where the display does not include overly bright spots or overly dim spots.

The top component 116, such as an antiglare component, meanwhile, comprises a film that functions, for example, to reduce glare of ambient light incident on the electronic device 100. In some instances, the film may comprise a hard-coated polyester and polycarbonate film, including a base polyester or a polycarbonate, that results in a chemically bonded UV-cured hard surface coating that is scratch resistant. In some instances, the top component film may be manufactured with additives such that the resulting film includes a hardness rating that is greater than a predefined threshold. Without such scratch resistance, a device may be more easily scratched and a user may perceive the scratches from the light that is dispersed over the top of the reflective display. It should be appreciated that the top component 116 may be configured to provide other desirable device characteristics.

The top component may couple to a top surface of the front light 114 via Optically Clear Adhesive (OCA), such as solid OCA, liquid OCA or the like. In some instances, a refractive index of the OCA atop the front light 114 and a refractive index of the OCA beneath the front light 114 are both less than a refractive index of the light guide 126 itself. For instance, the difference between the refractive index of the light guide 126 and the refractive index of each of the OCAs may be at least 0.3 in some instances. Selecting materials having low refractive indices on both sides of the light guide 126 may result in total internal reflection or near-total internal reflection of light from the light source 128. The top component 116 may, in some instances, also include a UV filter for the purpose of protecting components lower in the stack from UV of the light incident on the electronic device 100.

While FIG. 1 illustrates a few example components, the electronic device 100 may have additional features or functionality. In addition, some or all of the functionality described as residing within the device 100 may reside remotely from the device 100 in some implementations. In these implementations, the device 100 may utilize the network interfaces 118 to communicate with and utilize this functionality.

FIG. 2A illustrates a first example of a schematic cross-section 200 of the electronic device 100 along the line A-A from FIG. 1. The cross-section 200 illustrates the top component 116 residing atop the front light 114, which resides atop the touch sensor 106, which resides atop the reflective display 102. As illustrated, in this example the reflective display 102 includes a glass substrate 202 and a front plane laminate (FPL) 204. In some instances, the FPL comprises e-ink capsules, as well as the fluid in which the capsules move up or down, as described above with reference to electronic-paper displays. In addition, the FPL 204 may include a plastic film structure onto which the e-ink is coated using a roll-to-roll process. Thereafter, a conductive transparent electrode plastic film may then be combined with an adhesive layer and a release sheet to form one implementation of the FPL 204.

The touch sensor 106 may reside atop the reflective display 102, and may include a glass touch component 206. In instances where the touch sensor 106 comprises a capacitive touch sensor, traces made from Indium tin oxide (ITO), copper, printed ink or the like may reside atop the glass 206. An acrylic material may reside atop the traces for protection, with a color of this acrylic layer being tuned to ensure that a resulting color of the display 102 viewed by a user is correct. Furthermore, in some instances the device 100 may include a transparent conductor other than, or in addition to, ITO.

As is known, ITO layers in touch sensors essentially comprise rows and columns (e.g., in a diamond shape) of traces. Contrary to the electronic device 100 illustrated, traditional touch sensors typically include the ITO layer underneath the glass touch component or, potentially, with one layer of the ITO (e.g., the rows) underneath the glass and the other layer (e.g., the columns) atop the glass. As described above, however, the electronic device 100 may include the ITO layer entirely atop the glass touch component 206.

While the ITO layer on the glass touch component 206 typically needs protection, additional dielectric materials above the touch sensor 106 may provide this protection, as shown in the cross-section 200 of the electronic device 100. That is, the front light 114 and the top component 116 may provide protection to the ITO layer on the glass touch component 206. Furthermore, the ITO layer on the glass touch component 206 may then be filled with a liquid OCA (discussed below), which substantially eliminates the opportunity for air gaps to form. As is known, air gaps reduce the efficacy and accuracy of the resulting touch sensor. Because the electronic device 100 includes the ITO layer atop the glass touch component 206 (given the additional dielectric material atop the touch sensor 106), the ITO is essentially closer to a user's fingers using the touch sensor 106 and, therefore, the touch sensor 106 may be more effective than if the ITO layer were to reside underneath the glass. Again, the additional dielectric materials atop the touch sensor 116 make placement of the ITO layer atop the glass touch component 206 possible.

In the component stack illustrated in FIG. 2A, liquid optically clear adhesive (LOCA) 208 may be placed atop the glass touch component 206 (and the ITO traces), and reach into a space between a high reflectivity white tape 211 disposed between a light guide film (LGF) 210 and flexible printed circuit (FPC) 212 as discussed below. While illustrated as part of the touch sensor 106, the LOCA 208 may be separate from the touch sensor 106 in order to adhere together the various components between the glass touch 206 and the light guide film 210. As described above, during assembly the LOCA may be deposited onto the glass touch 206 and, when the LOCA 208 reaches the corners of the glass touch 206, the corners may be UV-cured. Thereafter, the LOCA 208 on the remaining portion of the glass touch 206 may be UV-cured. As discussed below, while this example includes LOCA, in other instances the LOCA 208 may be replaced with a solid OCA dimensioned to accommodate the various components between the glass touch 206 and the light guide film 210. In either instance, the LOCA or the SOCA may be formed from an acrylic material and/or, in some instances, from silicone. For instance, the LOCA may comprise Loctite® 5192 and/or MSDS made by Nalax3®. The MSDS comprises UV-curable polyurethane acrylates based in a formulation comprised of hexamethylene diacrylate, Urethane acrykate oligomer, Acyrlate ester and photoinitiator. This formulation may achieve balanced coating properties such as tensile properties, hardness, weatherability, and adhesion. The LOCA may be created by applying the formulation to polymethyl methyacrylate (PMMA) rolls using a wet coating method immediately followed by embossing and UV curing (e.g., using a Fusion lamp).

The front light 114 for lighting the reflective display 102 may reside atop the touch sensor 106. A light guide film (LGF) 210 of the front light 114 may couple to the touch sensor via the LOCA 208. The LGF 210 may include grating elements (or "surface relief forms"), as described in the referenced patent application, for directing light from the light source 128 onto the reflective display 102.

In the component stack of FIG. 2A the light source 128 may be coupled to a flexible printed circuit (FPC) 212, the high reflectivity white tape 211 and the light guide film 210 to essentially form the front light 114. In some instances, the light source 128 (e.g., one or more LEDs) may be coupled to the FPC 212 via an optically clear adhesive (OCA), such as a solid strip of OCA, LOCA or the like.

Again. the light source 128 is configured to push light into the light guide film 210. The uniformity of the light going into the light guide film 210 may impact the quality of light that the user sees coming from the display. The highly reflective white tape 211 under the light guide film 210 diffuses the light such that the light going into the light guide is substantially uniform. Accordingly, the light reflecting off of the display is also substantially uniform. Without the highly reflective white tape 211 imperfections in the light beams may result from the materials proximate to the light guide film 210 (such as the material that forms the flexible printed circuit 212) causing light beams to group together and form dark and/or bright areas, or non-uniform light thus negatively affecting the user's ability to read content on the display of the device 200.

In the example illustrated in FIG. 2A, space underneath the light guide film 210 presents an area to dispose the highly reflective white tape 211 using an OCA (LOCA or SOCA) that has substantially the same refractive index as the light guide film 210. Using OCA with substantially the same refractive index as the light guide film 210 helps maximize color and uniformity of the light.

In the component stack as illustrated, the amount of light that travels uniformly into the light guide film 210 is impacted by the refractive index of the adhesive either above or below the light guide film 210. That adhesive especially should be well controlled in the active area closest to the light guide-LED interface because that is where substantial reflections may occur. Acrylic OCA may be used for applications where it is desirable for the adhesive to have the same or similar refractive index to the light guide, and silicon based adhesive may be used for applications where it may be important for the refractive index to be dissimilar from the light guide, for example to compensate for off-color LEDs as discussed below.

The highly reflective white tape is, illustratively, dimensioned to have thickness from approximately 100 microns to approximately 8 microns. The thinner the white tape material the less opaque it is and so the less desirable it may be. One example of a white tape that may be used according to this disclosure is white polyethylene terephthalate (PET) film or equivalent with a thickness of approximately 30 microns, and a non-glossy surface finish on the surface configured to face the light guide film. As mentioned above, one example of high reflectivity white tape may be, for example, LAB W55 available from Teraoka Seisakusho Co. Ltd of Tokyo, Japan. LAB W55 is a white PET #40 (40 micrometer thickness) base film with 15 micrometer optically clear Acrylic adhesive disposed thereon, for a total thickness of approximately 55 microns. The white color of the tape, in the L*a*b* color space, may be L* of approximately 92.09, a* of approximately −0.06 and b* of approximately −2.66. A high shading rate (i.e., amount of light that is blocked by the tape), is desirable, as is high reflectivity (i.e., the amount of light bouncing off of the tape). For example, the LAB W55 has a shading rate of approximately 88% (with the average wavelength of light being blocked between 380 nm to 780 nm), and a reflectivity of approximately 88% (with the wavelength of light being reflected at about 400 nm). As discussed below, the specifications of the high reflectivity white tape may be tuned to compensate or complement the color of the light output of the LEDs.

It should be appreciated that other white tapes may be implemented, such as LAB W30 available from Teraoka Seisakusho Co. Ltd of Tokyo, Japan. Further, other white tapes, films or coverings may be implemented, such as polyethylene naphthalate (PEN), polyester or other white plastic films or surface coverings. The color of the highly reflective white tape may be defined, as discussed below, to further improve optical properties of the front light 114. In one aspect the tape may be opaque. In another aspect the surface of the white tape facing the light guide may be rough to provide a more uniform distribution of light in the direction of the user.

While FIG. 2A illustrates an example stack, other implementations may utilize the same or different components in the same or different orders. For instance, an implementation, illustrated in FIG. 2B, may include the glass touch component 206 on top of the device (with or without an antiglare component on top of that), with the touch-sensors traces (e.g., the ITO) residing underneath the glass. The front light, formed of the light source 128 coupled to the flexible printed circuit 212, the high reflectivity white tape 211 and the light guide film 210 may reside under the touch sensor, with the reflective display or merely a substrate or glass substrate 202 residing underneath the front light, and coupled to the front light via OCA 203, as illustrated in FIG. 2B.

In some examples, the stack may not include a reflective display at all. Instead, the front light 114 may light a component without a display, such as a keyboard, which may reside in place of the reflective display in the example stacks described herein.

It should be appreciated that although highly reflective white tape 211 is described above as being configured on the bottom of the light guide film, it may be desirable in some configurations to have white tape both above and under light guide film 210. As illustrated in FIGS. 2A and 2B a top white tape, 220, may be configured on a top portion of the light guide film 210. Another layer of OCA 216, 224 (e.g., solid OCA, LOCA, etc.) may be disposed atop the LGF 210 of the front light 214 (i.e. between the LGF 210 and top film 218 in FIG. 2A, and between the LGF 210 and touch glass 206 in FIG. 2B).

A top film 218, for example an antiglare component, may then be laid atop the entire stack (in either implementation). Alternative configurations for the top white tape 220 on top of the LGF 210 may be considered depending on the amount of space that might be available in the stack. For example, another thin layer of OCA may be disposed above the LGF 210 with additional white tape disposed between that OCA and the OCA 216 between the LGF 21 and top film 218 in FIG. 2A, and OCA 224 between the LGF 210 and touch glass 206 in FIG. 2B.

The white tape 211 disposed proximate to the LGF should be dimensioned near the active end of the light guide film 210 (i.e. where LED light enters) in a manner that ensures that light entering the light guide is properly reflected. With the white tape on the bottom of the LGF the bottom edge alignment with the LGF is important while the alignment of the other three sides may not be as critical. For white tape being placed on top, such as white tape 220, the positional tolerance is not too as critical so long as the connection between the LGF and the white tape starts at the edge of the light guide film 210. For either implementation, in the stacks illustrated, there may be at least approximately three millimeters of overlap between the edge of the light guide film 210 and where the white tape ends to ensure proper reflection of light at the active end of the light guide.

In some instances, the top-most surface of the stack (e.g., a surface of the top component 116 in these implementations) may be treated to provide a particular feel or roughness, such as a feel or roughness that substantially approximates that of paper or that otherwise enhances a feel of the device. In some instances, the top surface is etched, abraded, polished or otherwise treated to provide this feel or roughness.

The electronic device 100 may also include a bezel atop the top component 116. The bezel may be optically connected to the other elements in the stack. For instance, the bezel may couple to the top component 116 or to another component in the stack via SOCA, LOCA or via any of various other means. The bezel may function to absorb stray light from the light source 128, hence helping maintain the uniformity or smoothness of the light emitted by the front light 114 onto the display 102. To absorb light in this manner, in some instances the bezel is black or another dark color. Additionally or alternatively, the device 100 may include black or dark glue (or, a marker, an adhesive, or the like) around the edges of the display stack to similarly reduce reflections off of the edges of the front light 114 (i.e., to reduce the amount of light that escapes).

In one implementation, the resulting stack of components illustrated in FIG. 2A has a total thickness of approximately 2.5 mm. The reflective display 102 and the glass touch component 206 may have a thickness of approximately 1.58 mm, while the LOCA deposited thereon may have an approximate thickness of 130 microns. The LGF 210 may have an approximate thickness of 506 microns, while the OCA thereon may have a thickness of approximately 50 microns. Finally, if the top film 218 is an antiglare film, it may have an approximate thickness of 195 microns. These dimensions are merely illustrative as thicker or thinner dimensions may be appropriate depending on the circumstances.

In addition, while FIGS. 2A and 2B illustrate a light guide that has been described as having diffractive elements (in the form of grating elements), other embodiments may include other types of light guides, such as those that include refractive elements (e.g., lenslets to outcouple light from a light source). In addition, some embodiments may include respective light sources to light each side of the light guide.

After the light source 128 is coupled to the FPC 212, the FPC 212 may also couple to the LGF 210 via the OCA 214. In instances where the high reflectivity white tape 211 is disposed between the FPC 212 and the LGF 210, the FPC 212 may not be processed with a light-diffusing reflective coating (e.g., in the form of a white, matte finish) as the white tape 211 optically helps to diffuse and reflect light from the light source 128 and, hence, increase the uniformity of the light across the front light 114 and the display 102.

Figure 3A:
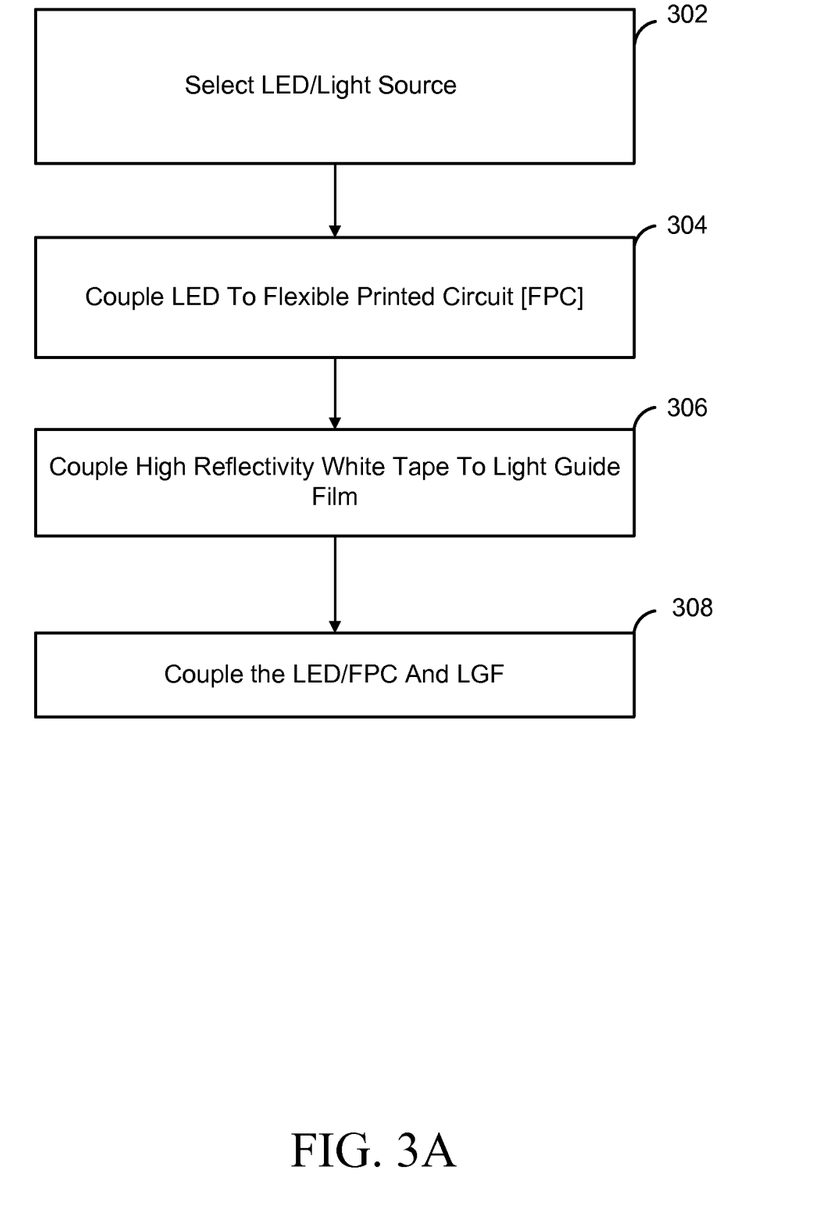
FIG. 3A illustrates an example flow diagram for assembling a light source with highly reflective white tape to improve uniformity of light through a light guide.

FIG. 3A illustrates an example process for assembling a light source with highly reflective white tape to improve uniformity of light through a light guide. As illustrated, a light source is selected, at 302. In the implementations described that would be one or more LEDs. The LED is first coupled to the flexible printed circuit (FPC), at 304, such as by engaging electrical contacts on the FPC with electrical contacts on the LED. Many variations of such electrical interconnections exist, including but not limited to through-hole soldering, surface mount soldering, mechanical contacts or the like. The white tape may then be coupled to the light guide film (LGF), at 306. While illustrated as a serial step, steps 304 and 306 may be conducted separately, in parallel or in reverse order. It should be appreciated that the LED may be coupled to the FPC and then, optionally, that assembly may be coupled to a bare light guide (i.e. without white tape), and then the white tape may be applied to the bottom side of the light guide thereafter. In the step of coupling the white tape to the light guide film, 306, it is significant for the configuration where the white tape is located between the FPC and the light guide that the edge of the white tape and the edge of the light guide to be uniformly aligned. An illustrative technique to ensure this alignment would be to apply the white tape to a master roll of light guide and then dye-cut the light guide to shape with the white tape in place, thus achieving substantially exact alignment between the white tape edge and the light guide edge. Other approaches may be considered, such as joining the light guide film and the white tape and lapping the joined edge to ensure alignment. Alternatively, precise mechanical alignment of fixtures aligning the materials for alignment and coupling may be considered.

It may also be desired for the white tape to go on the light guide first, before coupling the light guide to the LED/FPC, otherwise if the white tape is located on the FPC and then the light guide is attached wrinkles or bubbles may form in the white tape that will negatively affect uniformity. The front light assembly should be constructed with minimal wrinkles or bubbles as any wrinkle or bubble may impact by the light creating non-uniformity when the light waves travel through the light guide, thus resulting in undesired shadows and/or light aberrations in the active area.

Figure 3B:
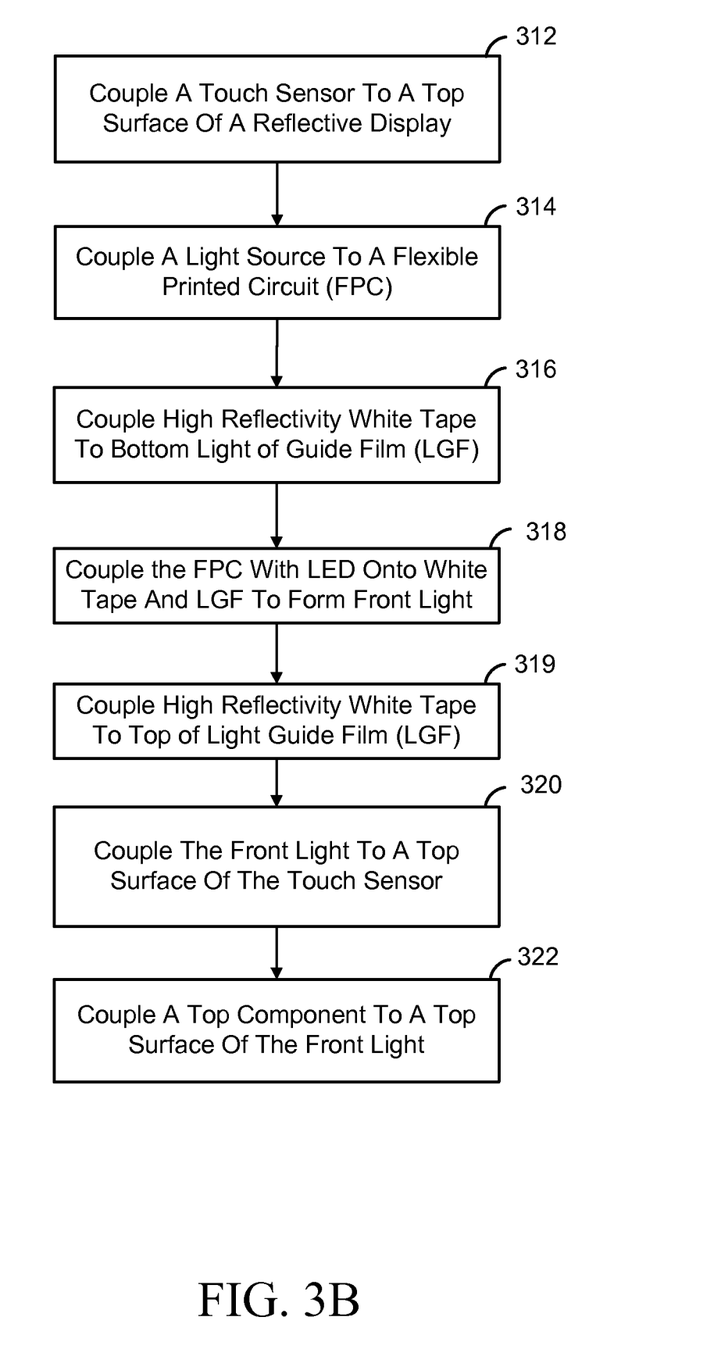
FIG. 3B illustrates an example flow diagram of assembling an electronic device that includes a front light formed of light guide film having a light source, and highly reflective white tape adhered to a flexible printed circuit board.

FIG. 3B illustrates an example process for assembling an electronic device including the component stack and front light described herein. The order in which the operations are described is not intended to be construed as a limitation, and any number of the described operations can be combined in any order and/or in parallel to implement the process.

The process includes, at 312, coupling a capacitive (or other) touch sensor to a top surface of a reflective display. Thereafter, a front light is assembled by coupling a light source and a flexible printed circuit (FPC) 314 in a separate stack before attaching this stack to the remaining components of the device. At 314, for instance, the process includes coupling a light source (e.g., an LED) to the FPC, such as via a strip of solid optically clear adhesive (SOCA). At 316, high reflectivity white tape is coupled to a bottom surface of the light guide film as described above, which may increase the diffusion and uniformity of light from the light source. It should be appreciated that the white tape may be adhered to the light guide film before or after the light guide film is adhered to the LED/FPC assembly. At 318, the process includes coupling the FPC with the light source or LED, to the light guide and the white tape. At step 319, high reflectivity white tape, as described and illustrated with respect to FIGS. 2A and 2B, may be coupled to a top surface of the light guide film.

At 320, the front light is coupled to a top surface of the capacitive touch sensor. This may include depositing and curing a layer of liquid optically clear adhesive (LOCA) atop the capacitive touch sensor and laying the front light atop the LOCA. At 322, the process then includes coupling a top component, such as an antiglare component, to a top surface of the front light, such as via a strip of solid OCA. It should be noted that one or more of the steps in FIG. 3 may be optional, as a function of the structure and application(s) of the device. For example, having a touch sensor is an option, and a display according to the disclosure may be implemented with or without a touch sensor (and/or other components).

In front light illumination systems the output color and contrast is highly dependent on LED color. The desired color is a white color that is least obtrusive to the eye. A yellow or pink hue is distracting and takes away from the reading experience in devices delivering reading content. To control color output, the high reflectivity white tape discussed herein may be selected to be of a controlled white hue to compensate for variances in color of LEDs where the LED color is slightly off from ideal white. In this way the complementary color of the high reflectivity tape combined with the color of the LED will cause the output spectrum to be uniform and white. Accordingly, the LEDs selected for inclusion in the electronic device may have a color that is not necessarily optimized for the reflective display 102 (and the resulting display of content to the user). This may allow selection of lower cost LEDs. The color of the tape may be chosen to compensate for the color of those LEDs allowing a wider range of off-from-ideal white LEDs to be used in devices.

Furthermore, color definition of the white tape as described herein facilitates augmenting the color/shading properties of the LED or the flexible printed circuit (which itself will have an off-color that may otherwise have to be controlled). That is, by defining the color of the white tape, to the extent a batch of LEDs that might be used in construction of the device is shifted in a particular direction in the color space, defining a complementary tape color may compensate for the color shift of the LED. Thus the tape color may correspond to the light color output from an LED such that the light emitted through the light guide has a desired color. For example, if the color of the LED is very blue then defining color of the tape that is more yellow will make the overall color of light reflecting through the light guide essentially white. This concept of a tape color corresponding to a color of the LED light may be implemented, for example, by using white tape that results in the LED light color falling within appropriate white color space within the L*a*b Color Space or color model, as known in the art. The LAB color space represents the way the human eye sees color. LED light color through a light guide may be impacted by the application of highly reflective white tape applied proximate to the light guide, such that the desired "white" color of the LED light output, defined in terms of the L*a*b Color Space or color model, falls within a u' and v' of the color space that is desired "white," for example a u' of 0.24 and a v' of 0.48, although other "white" areas that lie within the color space may also be acceptable.

LEDs that are purchased for lighting devices generally have a defined color range. LED manufacturing typically involves producing LEDs with multiple color ranges. Each LED lot is typically measured to determine the precise color produced by the LEDs. If a lot is manufactured with a color outside of desired device specifications the LED lot may have limited or no utility as use of LEDs with undesired color specifications may result in undesired device performance. On the other hand, if only a portion of manufactured LEDs are used in device production other manufactured LEDs may be discarded, leading to increased cost and/or waste in the manufacturing process. The ability to accept a wider range of LED colors is facilitated by the ability to match LED color with highly reflective tape color that will compensate for the LED color. Thus, by configuring tape color to match LED color, a larger variety of LED color spectrums may be acceptable for device configuration thus reducing the number of LEDs that may be discarded, increasing LED manufacturing yield and reducing costs for LED production and device production.

Figure 4:
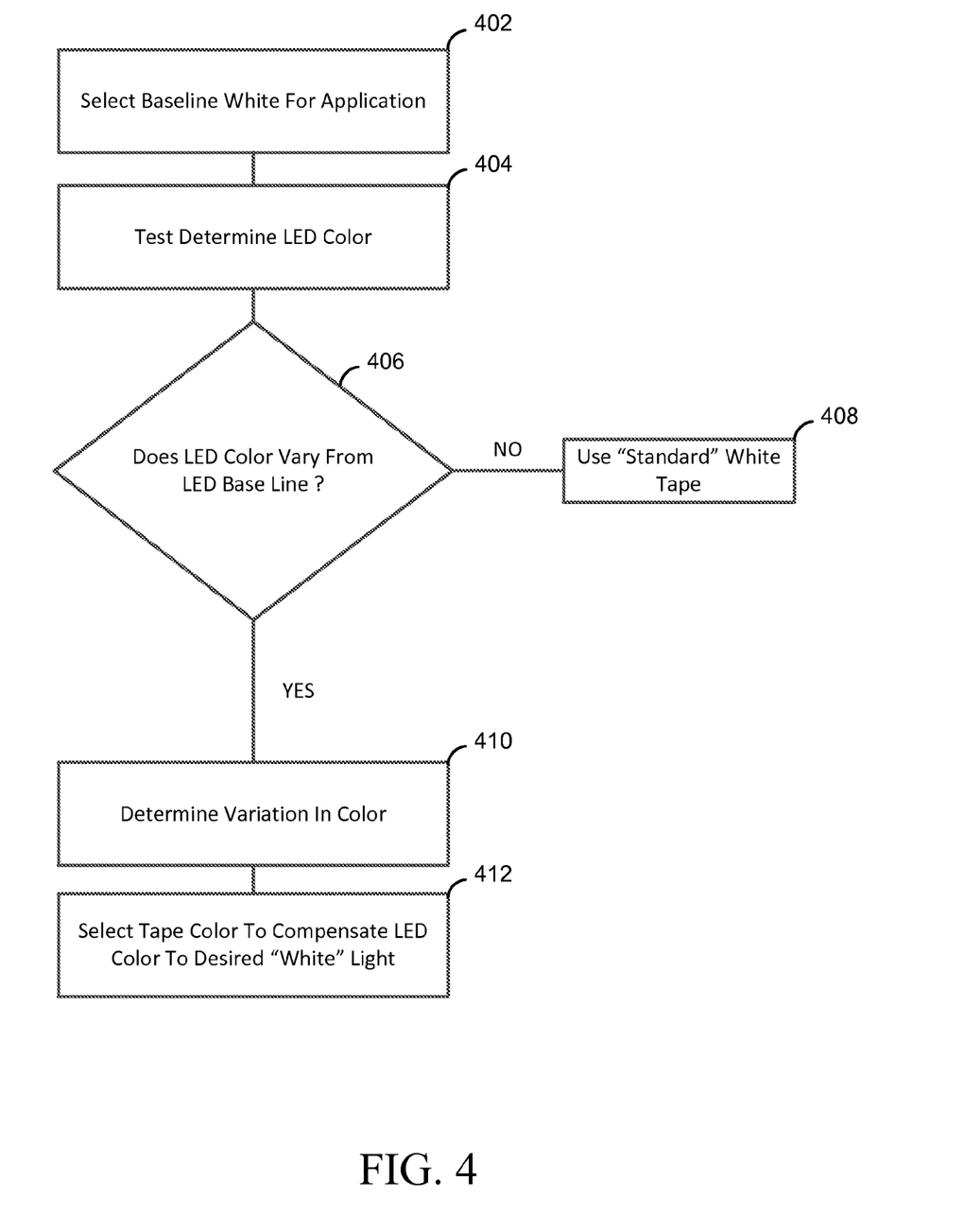
FIG. 4 illustrates an example flow diagram of a method of compensating for variations in LED color by use of a complementary high reflectivity tape to improve light output and light beam uniformity.

FIG. 4 illustrates a method of compensating for variations in LED color by use of a complementary high reflectivity tape to improve light output and light beam color uniformity. At 402 a desired, baseline, white light color output is selected for the application. Generally, deviations from pure white are undesirable. At 404 LED color is determined, such as by conducting testing known to those skilled in the art. A determination is made, at 406, whether the LED color varies from the baseline, desired color. If the LED color does not vary (tolerances may be set to gauge variability) standard white high reflectivity tape is used, 408, i.e., tape that does not implement any compensation. If the LED color does vary from the baseline, outside some expected or desired limit, then a quantum of variation is determined, at 410. Based on that quantum of variation a high reflectivity tape color is selected, at 412, to compensate the deviating LED, or batch (es) of deviating LEDs, back to the desired baseline color white (or other desired color) appropriate for the application.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
   at least one processor;
   a memory, coupled to the at least one processor and storing at least one content item;
   a display configured to display the content item and comprising a top surface;

a front light assembly to provide a desired display light, the front light assembly comprising:
  a light guide,
  a light emitting diode (LED) at an edge of the light guide, the LED having a color varying from a baseline color, the LED and light guide being configured to emit display light onto the top surface of the display,
  a high reflectivity tape coupled on an underside of the light guide at the edge of the light guide and adjacent to the LED, the high reflectivity tape having a tape color selected to compensate the color of the LED to substantially match a color of the desired display light, and
  a flexible printed circuit coupled under the light guide with the high reflectivity tape between an upper surface of the flexible printed circuit and the underside of the light guide.

2. The electronic device of claim 1, wherein the high reflectivity white tape has a rough surface to provide a more uniform distribution of light in a direction of a user and the rough surface is disposed facing the underside of the light guide.

3. The electronic device of claim 1, further comprising a top component coupled at least in part to the top surface of the light guide, wherein:
  the top component is selected to provide a characteristic of the display, including at least one of an antiglare characteristic, a hardness characteristic, a scratch-resistance characteristic and a texture characteristic, and
  the high reflectivity tape is coupled at least in part to the light guide via an optically clear adhesive having a substantially same refractive index as the light guide and the optically clear adhesive is one or more of solid optically clear adhesive (SOCA) or liquid optically clear adhesive (LOCA).

4. A method of constructing a light assembly to produce a desired display light, comprising:
  determining a color of a light emitting diode (LED) relative to a baseline color;
  providing a high reflectivity tape having a tape color that compensates the color of the LED to substantially match a color of the desired display light;
  coupling the high reflectivity tape with an underside of a light guide, the light guide coupled to the LED at an edge of the light guide, wherein the tape color compensates the color of the LED emitted through the light guide to provide the desired display light; and
  coupling a flexible printed circuit under the light guide with the high reflectivity tape between an upper surface of the flexible printed circuit and the underside of the light guide.

5. The method of claim 4, further comprising:
  coupling the high reflectivity tape at least in part to the light guide via an optically clear adhesive.

6. The method of claim 5, wherein the optically clear adhesive is one or more of solid optically clear adhesive (SOCA) or liquid optically clear adhesive (LOCA), and the optically clear adhesive has a substantially same refractive index as the light guide.

7. The method of claim 5, wherein the high reflectivity tape has a rough surface to provide a more uniform distribution of light in a direction of a user and the rough surface is disposed facing the underside of the light guide.

8. An apparatus comprising a light assembly, the light assembly comprising:
  a light guide;
  a high reflectivity tape coupled on an underside of the light guide, the high reflectivity tape having a tape color;
  a flexible printed circuit coupled under the light guide with the high reflectivity tape between an upper surface of the flexible printed circuit and the underside of the light guide; and
  a light emitting diode (LED) at an edge of the light guide, the LED having a LED color varying from a baseline color, the tape color compensating the LED color to cause a desired display light to be emitted through the light guide.

9. The apparatus of claim 8, wherein the high reflectivity tape has a rough surface to provide a more uniform distribution of light in a direction of a user and the rough surface is disposed facing the underside of the light guide.

10. The apparatus of claim 8, wherein the high reflectivity tape is coupled at least in part to the light guide via an optically clear adhesive, and wherein the optically clear adhesive is one or more of solid optically clear adhesive (SOCA) or liquid optically clear adhesive (LOCA).

11. The apparatus of claim 10, wherein the optically clear adhesive has a substantially same refractive index as the light guide.

12. The apparatus of claim 8, wherein the light assembly is configured in a display component stack of an electronic device, and wherein the electronic device further comprises a display configured to display content and a touch sensor coupled to a top surface of the display and configured to receive touch input.

13. The apparatus of claim 12, configured in a front light coupled to the touch sensor and configured to direct light onto the display.

14. The apparatus of claim 13, wherein the front light couples to the touch sensor via an optically clear adhesive (OCA) selected from at least one of solid optically clear adhesive (SOCA) or liquid optically clear adhesive (LOCA).

15. The apparatus of claim 12, wherein the electronic device further comprises a top component, wherein the top component is selected to provide a characteristic of the display, including at least one of an antiglare characteristic, a hardness characteristic, a scratch-resistance characteristic and a texture characteristic.

16. The apparatus of claim 8, further comprising a second high reflectivity tape on a top portion of the light guide.

17. The apparatus of claim 8, further comprising at least one processor, memory, coupled to the at least one processor and storing at least one content item, a display configured to display the content item and comprising a top surface, and a front light including the light assembly to light the display.

18. The apparatus of claim 17, further comprising a top component coupled to a top surface of the front light.

19. The apparatus of claim 18, wherein the top component is selected to provide a characteristic of the display, including at least one of an antiglare characteristic, a hardness characteristic, a scratch-resistance characteristic and a texture characteristic, and wherein the top component couples to the front light via one or more of solid optically clear adhesive (SOCA) or liquid optically clear adhesive (LOCA).

20. The method of claim 4, further comprising:
  determining a quantum of variation of the color of the LED to the baseline color.

21. The method of claim 20, wherein the providing the high reflectivity tape having the tape color is based on the quantum of variation.

* * * * *